(12) United States Patent
Wood

(10) Patent No.: US 7,300,370 B2
(45) Date of Patent: Nov. 27, 2007

(54) CLUTCH SYSTEM FOR BELTED CONSTANT VELOCITY TRANSMISSION

(76) Inventor: Gordon Wood, 3417-42 Street, Leduc, AB (CA) T9E 6C5

( * ) Notice: Subject to any disclaimer, the term of this patent is extended or adjusted under 35 U.S.C. 154(b) by 599 days.

(21) Appl. No.: 10/854,029

(22) Filed: May 26, 2004

(65) Prior Publication Data

US 2005/0277502 A1 Dec. 15, 2005

(51) Int. Cl.
*F16H 55/36* (2006.01)
*F16H 55/56* (2006.01)
*F16H 59/00* (2006.01)

(52) U.S. Cl. .............................. 474/10; 474/19; 474/17

(58) Field of Classification Search .................... 474/8, 474/10, 12, 14, 15, 17, 18–19, 20–21, 37, 474/46

See application file for complete search history.

(56) References Cited

U.S. PATENT DOCUMENTS

| | | | | |
|---|---|---|---|---|
| 2,276,186 A | * | 3/1942 | Getchell | ....................... 474/19 |
| 4,523,917 A | * | 6/1985 | Schildt | ......................... 474/19 |
| 4,564,357 A | * | 1/1986 | Thirion de Briel | ........... 474/14 |
| 5,580,324 A | * | 12/1996 | Landry | ......................... 474/19 |
| 6,413,178 B1 | * | 7/2002 | Chamberland | ............... 474/19 |
| 2005/0096163 A1 | * | 5/2005 | Gu et al. | ....................... 474/10 |

* cited by examiner

*Primary Examiner*—Marcus Charles
(74) *Attorney, Agent, or Firm*—Raymond M. Galasso; Galasso & Associates, LP

(57) ABSTRACT

A clutch for a belted transmission comprises a sheave, a first torque ramp member, a second torque ramp member, a drive ring and an electromagnet. The first torque ramp member is attached to the sheave and has a ramp face. The second torque ramp member is spaced apart from the first torque ramp member and has a ramp face opposing the ramp face of the first torque ramp. A drive ring is disposed between the first and second torque ramp members and has a button slider engaged between the ramp face of the first torque ramp member and the ramp face of the second torque ramp member. The electromagnet is configured for one of repelling the first torque ramp member from the second torque ramp member along a reference axis and attracting the first torque ramp member toward the second torque ramp member along the reference axis.

7 Claims, 2 Drawing Sheets

CLUTCH SYSTEM FOR BELTED CONSTANT VELOCITY TRANSMISSION

FIELD OF THE DISCLOSURE

The disclosures made herein relate generally to constant velocity transmissions and, more particularly, to clutch systems for belted constant velocity transmission.

BACKGROUND

A belted constant velocity transmission (CVT) is a relatively simple, inexpensive, effective and reliable system for transferring power in vehicles. Belted CVT's are presently used in or have application in vehicles including snowmobiles, all-terrain vehicles, small road racing vehicles and the like. Belted CVTs, albeit more complex versions, also have application in automobiles.

Belted CVT's as used in recreational vehicles such as snowmobiles are relatively efficient in power transfer when properly tuned (i.e., calibrated) for a particular type of usage. In the case of a snowmobile, examples of particular types of usage include mountain trails, touring activities, circle track racing, endurance racing, etc. Overall CVT clutch efficiency in conventional belted CVT's is based on clutch system factors such as, but not limited to, sheave diameter, sheave weight, sheave face angles, belt contact patch area, clutch spring rates, clutch flyweight weights and torque ramp rates. However, clutch spring rates, clutch flyweight weights and torque ramp rates are the factors that are generally tunable by a rider or mechanic once the vehicle leaves the factory.

Conventional belted CVT's and their associated clutch systems exhibit one or more limitations that adversely affect their effectiveness, desirability and/or practicality. One limitation is that clutch system efficiency is application dependent. For example, a clutch tuned for mountain trail riding will generally offer less than desirable efficiency and performance in an endurance racing application. Another limitation is that tunability is limited. Generally speaking, tuning is limited to a few factors (e.g., clutch spring rates, clutch flyweight weights and torque ramp rates) and such factors are only coarsely adjustable (i.e., discrete rates/weights with limited selection). Another limitation is that tuning is time consuming in that it requires the clutch system to be at least partially disassembled and manually tuned. Still another limitation is that achieving effective tuning results is largely based on experience garnished from trial end error.

Therefore, a clutch system for a belted CVT that overcomes limitations associated with conventional clutch systems for belted CVT's would be useful and novel.

SUMMARY OF THE DISCLOSURE

In one embodiment, a clutch for a belted transmission comprises a sheave, a first torque ramp member, a second torque ramp member, a drive ring and an electromagnet. The first torque ramp member is attached to the sheave and has a ramp face. The second torque ramp member is spaced apart from the first torque ramp member and has a ramp face opposing the ramp face of the first torque ramp member. A drive ring is disposed between the first and second torque ramp members and has a button slider engaged between the ramp face of the first torque ramp member and the ramp face of the second torque ramp member. The electromagnet is configured for one of repelling the first torque ramp member from the second torque ramp member along a reference axis and attracting the first torque ramp member toward the second torque ramp member along the reference axis.

In another embodiment, a clutch for a belted transmission comprises a first sheave assembly, a second sheave assembly and an energizing unit. The first sheave assembly includes a shaft and a first sheave fixedly attached to the shaft. The second sheave assembly includes a second sheave movably mounted on the shaft and a first torque ramp member attached to the second sheave. The first torque ramp member has a ramp face and the second sheave is movable along a longitudinal axis of the shaft. The energizing unit fixedly attached to the shaft and includes an electromagnet and a second torque ramp member spaced apart from the first torque ramp member. The second torque ramp member has a ramp face opposing the ramp face of the first torque ramp member. The electromagnet is configured for one of repelling the first torque ramp member from the second torque ramp member along the longitudinal axis of the shaft and attracting the first torque ramp member toward the second torque ramp member along the longitudinal axis of the shaft. The drive ring is disposed between the first and second torque ramp members and has a button slider engaged between the ramp face of the first torque ramp member and the ramp face of the second torque ramp member.

In still another embodiment, a belted transmission system comprises a pair of clutches and a programmable controller. Each one of the clutches comprises a first sheave assembly, a second sheave assembly and an energizing unit. The first sheave assembly includes a shaft and a first sheave fixedly attached to the shaft. The second sheave assembly includes a second sheave movably mounted on the shaft for being moved along a longitudinal axis of the shaft. The energizing unit is fixedly attached to the shaft and includes an electromagnet. The electromagnet and the sheave assemblies are configured for one of moving the second sheave toward the first sheave along the longitudinal axis of the shaft and moving the second sheave away from the first sheave along the longitudinal axis of the shaft. The programmable controller is attached to the electromagnet of each one of the clutches and is configured for selectively energizing the electromagnet of each one of the clutches to implement movement of the second sheave of a respective one of the clutches.

Accordingly, it is a principal object of the inventive disclosures made herein to provide a novel and advantageous clutch system for belted transmissions that overcomes limitations associated with conventional clutch systems for belted transmissions. Specifically, clutches and clutch systems in accordance with embodiments of the disclosures made herein are electronically tunable such that clutch system efficiency is not application dependent, exhibit tunability that is relatively unlimited, can be tuned in minutes rather than hours, do not require any disassembly of the clutches, enable professional results to be rapidly, readily and repeatedly achieved by non-professional riders and tuners, and enable seemingly instantaneously reactions to changes in the terrain or a rider's style.

In at least one embodiment of the inventive disclosures made herein, the energizing unit of each clutch includes a plurality of power inputs for the electromagnet and a speed sensor device.

In at least one embodiment of the inventive disclosures made herein, a programmable controller is connected to the power inputs and the speed sensing device for enabling positional control of the movable sheave of the clutch.

In at least one embodiment of the inventive disclosures made herein, a permanent magnet is attached to the first torque ramp member of a clutch for enhancing response to the field of the electromagnet.

In at least one embodiment of the inventive disclosures made herein, magnetic poles of the permanent magnet are orientated with respect to as-energized magnetic poles of the electromagnet for one of repelling the first torque ramp member from the second torque ramp member along a reference axis and attracting the first torque ramp member toward the second torque ramp member along the reference axis.

In at least one embodiment of the inventive disclosures made herein, at least a portion of the first torque ramp member of a clutch is made from a magnetically sensitive material (e.g., steel).

In at least one embodiment of the inventive disclosures made herein, the second torque ramp member is an integral component of the electromagnet.

These and other objects of the inventive disclosures made herein will become readily apparent upon further review of the following specification and associated drawings.

DETAILED DESCRIPTION OF THE DRAWINGS

Figure 1:
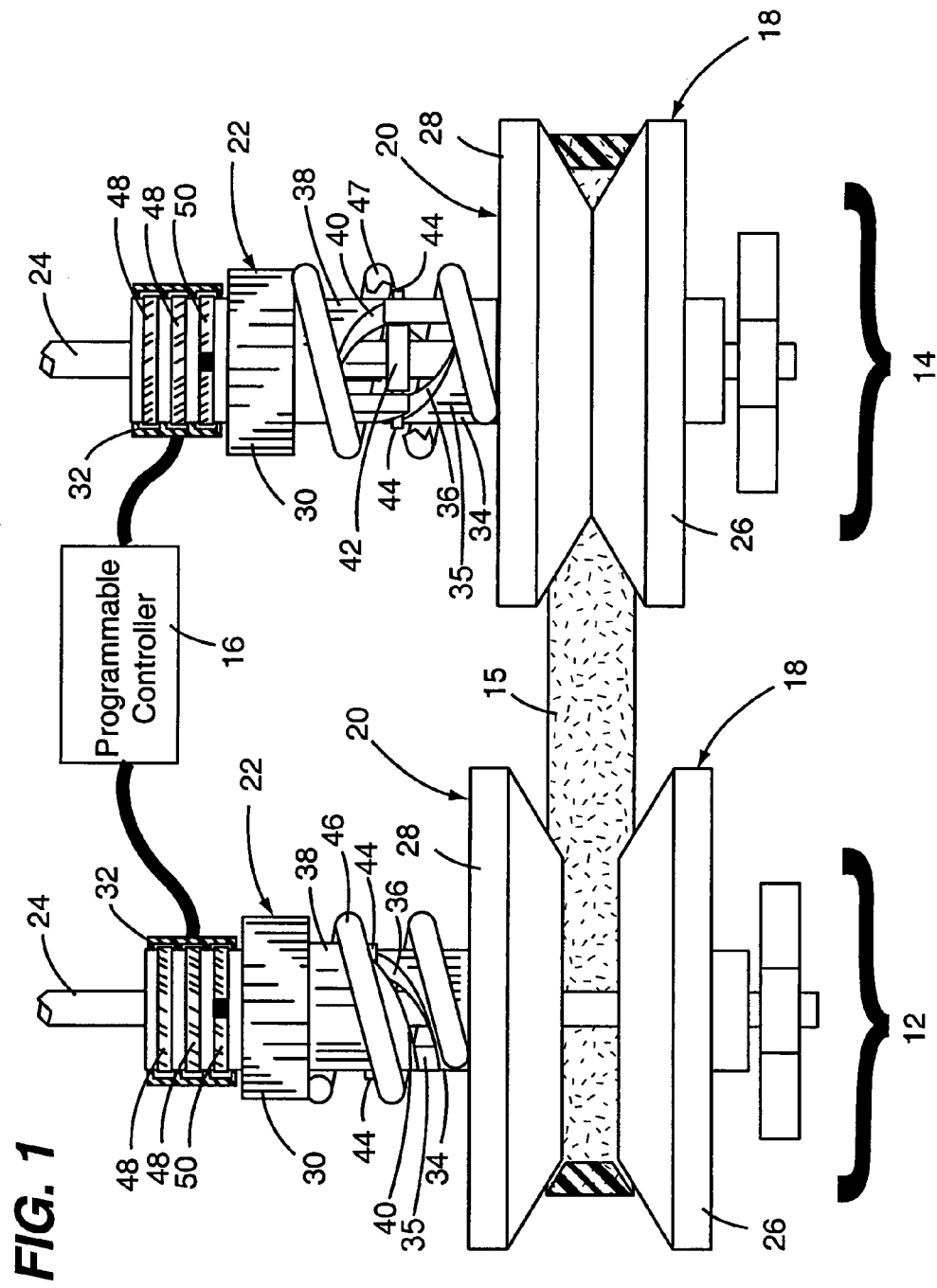
FIG. 1 depicts a belted transmission system in accordance with an embodiment of the inventive disclosures made herein.

FIG. 1 depicts a belted transmission system 10 in accordance with an embodiment of the inventive disclosures made herein. The belted transmission system 10 includes a first clutch 12, a second clutch 14 (i.e., power output clutch), a belt 15 coupled between the clutches (12, 14) and a programmable controller 16. In a typical application, the first clutch 12 is a power input clutch (i.e., primary clutch) mated to an output shaft of an engine or motor and the second clutch 14 is a power output clutch (i.e., secondary clutch) mated to an input shaft of a drive apparatus (e.g., snowmobile track).

Each one of the clutches (12, 14) comprises a first sheave assembly 18, a second sheave assembly 20 and an energizing unit 22. Each first sheave assembly 18 includes a shaft 24 and a first sheave 26 fixedly attached to the shaft 24. Each second sheave assembly 20 includes a second sheave 28 movably mounted on the shaft 24 for being moved along a longitudinal axis of the shaft 24 and for being rotated around the longitudinal axis of the shaft 24. In at least one embodiment of the inventive disclosures made herein, a bushing (not specifically shown) is disposed between the shaft 24 and the second sheave 28 of each one of the clutches (12, 14) for reducing friction and providing a replaceable wear surface. Each energizing unit 22 is fixedly attached to the shaft and includes an electromagnet 30 and an electrical contact unit 32.

The second sheave assembly 20 of each one of the clutches (12, 14) includes a first torque ramp member 34 attached to the second sheave 28. The first torque ramp member 34 of each one of the clutches (12, 14) has a pair of respective ramp faces 36 (i.e., identical torque ramps faces separated by 180 degrees). Each energizing unit 22 includes a second torque ramp member 38 spaced apart from the first torque ramp member 34. The second torque ramp member 38 of each one of the clutches (12, 14) has a pair of respective ramp faces 40 (i.e., identical torque ramps faces separated by 180 degrees) opposing the respective pair of ramp faces 36 of the first torque ramp member 34. In one embodiment, the second torque ramp member 38 is an integral component of the electromagnet 30.

In at least one embodiment of the inventive disclosures made herein, the second torque ramp member 38 and the energizing unit 22 of each one of the clutches (12, 14) are electrically insulated and/or magnetically isolated from the respective shaft 24 by way of a bushing (not specifically shown). For example, such bushing is made from a material that is electrically insulating and/or magnetically non-reactive (e.g., non-ferrous).

A drive ring 42 is disposed between the first torque ramp member 34 and second torque ramp member 38 of each one of the clutches (12, 14). The drive ring 42 serves to transfer power from the first and second torque ramp members (34, 38) while permitting relative rotation between the first and second torque ramp members (34, 38). Each drive ring 42 includes a pair of button sliders 44. One of the button sliders 44 is engaged between a mating one of the ramp faces 36 of the first torque ramp member 34 and a mating one of the ramp faces 40 of the second torque ramp member 38.

It is contemplated herein that the torque ramp members (34, 38) may each include more than 2 torque ramp faces or one torque ramp face. A plurality of torque ramp faces is advantageous as it enables a balanced force distribution with respect to the longitudinal axis of the shaft 24. Such a balanced force distribution is preferred as it reduces bind that leads to wear and reduced response rate.

Preferably, a first spring 46 is disposed between the first torque ramp member 34 and the second torque ramp member 38 of the first clutch 12 and a second spring 47 (depicted as partially fragmented for clarity of underlying components) is disposed between the first torque ramp member 34 and the second torque ramp member 38 of the second clutch 14. Such a torsion spring biases the second sheave 28 toward the first sheave 26. Additionally, the spring is preferably disposed in a manner for imparting a torsional force on the second sheave 28 with respect to the first sheave 26. Accordingly, the spring is both a torsion spring, aids in maintaining contact between clutch components (e.g., maintain the torque ramp members in contact with the respective button slider to reduce the potential for vibrations, backlash in the drivetrain, drivetrain noise, etc), aids in absorbing loads applied to the sheaves (e.g., when the engagement speed is reached and the clutches (12, 14) start to transfer power through the belt 15 and when back shifting occurs due to terrain conditions).

The programmable controller 16 is configured for selectively energizing the electromagnet 30 of each one of the clutches (12, 14) to implement movement of the second sheave 28 of a respective one of the clutches (12, 14). The programmable controller 16 is attached to the energizing unit 22 of each clutch (12, 14) through the electrical contact unit 32 of each energizing unit 22. The electrical contact unit 32 (e.g., a slip ring unit) includes a plurality of slip bands 48 (i.e., power inputs) for enabling power to be delivered to a respective one of the electromagnets 30 and at least one slip band 50 (e.g., a speed sensing device) for enabling a respective shaft speed to be sensed.

Based on the speed of the shafts 24, the programmable controller 16 is able to vary electrical power (e.g., variable output of voltage) applied to the electromagnets 30, thereby changing the drive ratio from a torque setting to a speed setting or vice-versa. To facilitate such control over the electromagnets (30), the programmable controller 16 needs to know the speed of the shafts 24. In one embodiment, the slip band 50 is configured as a reluctor with a master notch in it that is sensed for determining the speed of a respective on e of the shafts 24. By so doing, the programmable controller 16 is able to identify any slippage in the belt 15 or any slippage from the vehicle that it is powering and back shift accordingly. Preferably, the energizing units 22 are configured for sensing speed of a respective shaft 24.

The energizing unit 22 and the sheave assemblies of the first clutch 12 are configured for urging the second sheave 28 of the first clutch 12 toward the first sheave 26 of the first clutch 12 along the longitudinal axis of the respective shaft 24. Similarly, the energizing unit 22 and the sheave assemblies of the second clutch 14 are configured for urging the second sheave 28 of the second clutch 14 away from the first sheave 26 of the second clutch 14. In this way, the radial position of the belt 15 on the sheaves (26, 28) changes, thus changing the drive ratio between the first and second clutches (12, 14).

Preferably, the first torque ramp member 34 of each clutch (12, 14) include a permanent magnet (35) that is either attached to the first torque ramp member 34 or comprised by the first torque ramp member 34. Such use of a permanent magnet (35) provides the electromagnet 30 with a strong opposing magnetic field. In contrast to the first torque ramp member being comprised entirely from steel (i.e., a magnetically reactive material), use of a permanent magnet (35) insure a strong and instantaneous response to the field of the electromagnet 30. Magnetic poles of the permanent magnet are orientated with respect to as-energized magnetic poles of a respective one of the electromagnets 30 for either repelling the first torque ramp member 34 from the second torque ramp member 38 (e.g., for the first clutch 12) or attracting the first torque ramp member 34 toward the second torque ramp member 38 (e.g., for the second clutch 14). However, it is contemplated herein that, in some applications and embodiments, the permanent magnet may be omitted.

Figure 2:
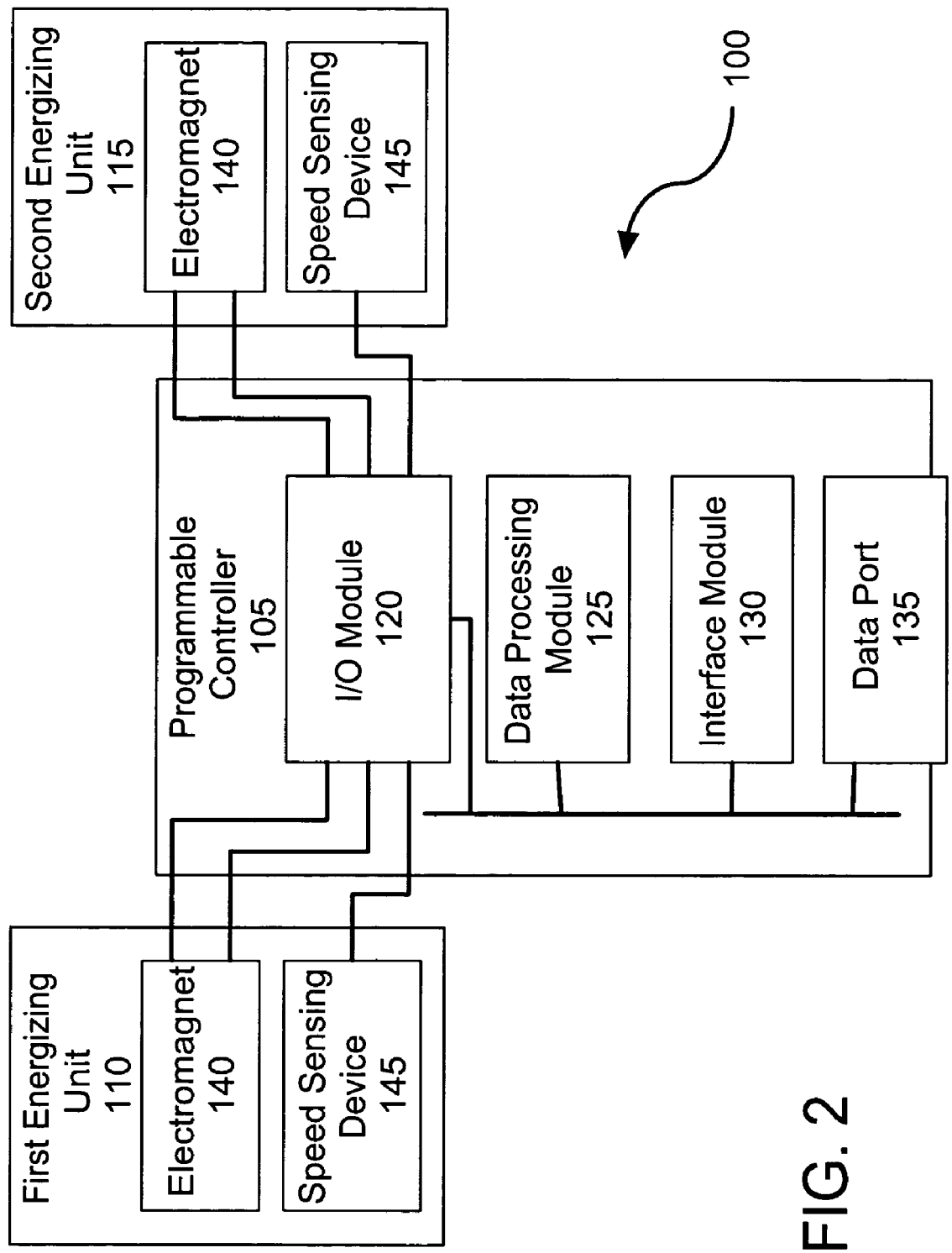
FIG. 2 depicts a belted transmission control apparatus in accordance with an embodiment of the disclosures made herein.

FIG. 2 depicts a belted transmission control apparatus 100 in accordance with an embodiment of the disclosures made herein. The belted transmission control apparatus 100 includes a programmable controller 105 (e.g., the programmable controller 16 discussed above), a first energizing unit 110 (i.e., an energizing unit of a first clutch) and a second energizing unit 115 (i.e., an energizing unit of a second clutch). The programmable controller 105 includes an input-output module 120, a data processing module 125, an interface module 130 and a data port 135. The input-output module 120, the data processing module 125, the interface module 130 and the data port 135 are interconnected for enabling interaction therebetween. Each one of the energizing units (110, 115) includes an electromagnet 140 and a speed sensing device 145.

The input-output module 120 is coupled to the electromagnet 140 and speed sensing device 145 of each energizing unit (110, 115) for enabling power and signal delivery to be facilitated therebetween. The data processing module 125 is configured (i.e., programmed) for controlling clutch operation in accordance with a particular environment, riding style, vehicle configuration and other parameters. The data port 135 enables interconnection to an external programming device (e.g., a laptop computer, personal data assistant or the like) with the data processing module 125 (e.g., memory of the data processing module) via the interface module 130.

A programmable controller in accordance with embodiments of the inventive disclosures made herein allow a rider or tuner to change the transmission operating characteristics (i.e., power delivery characteristics) to suit the terrain, driving style and vehicle configuration. Examples of such transmission operating characteristics include shift points and engagement speed. To change such transmission operating characteristics, a programming device is connected to the data port 135. In one embodiment, data port is provided in the dashboard of the vehicle, making it readily accessible. Once connected, a desired program for controlling operation can be downloaded from the programming device and/or operating data can be uploaded from the programmable controller 105 to the programming device. Thus, rather than making changes to physical clutch components (e.g., flyweights, spring pressure, torque ramps, etc), revised transmission operating characteristics are accomplished electronically and programmatically.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A belted transmission system, comprising:
 a pair of clutches, each one of said clutches comprising:
  a first sheave assembly including a shaft and a first sheave fixedly attached to the shaft;
  a second sheave assembly including a second sheave movably mounted on the shaft for being moved along a longitudinal axis of the shaft; and
  an energizing unit fixedly attached to the shaft and including an electromagnet, wherein the electromagnet and the sheave assemblies are configured for one of moving the second sheave toward the first sheave along the longitudinal axis of the shaft and moving the second sheave away from the first sheave along the longitudinal axis of the shaft; and
 a programmable controller attached to the electromagnet of each one of said clutches and configured for selectively energizing the electromagnet of each one of said clutches to implement movement of the second sheave of a respective one of said clutches.

2. The system of claim 1 wherein:
 the energizing unit of each one of said clutches includes a plurality of power inputs for the electromagnet and a speed sensor device; and
 the programmable controller is connected to said power inputs and the speed sensing device.

3. The system of claim 1, further comprising:
 a drive ring disposed between the first and second torque ramp members of each one of said clutches;
 wherein the second sheave assembly of each one of said clutches includes a first torque ramp member attached to the second sheave;

wherein the first torque ramp member of each one of said clutches has a ramp face;

wherein the energizing unit of each one of said clutches includes a second torque ramp member spaced apart from the first torque ramp member;

wherein the second torque ramp member of each one of said clutches has a ramp face opposing the ramp face of the first torque ramp member; and wherein the drive ring of each one of said clutches includes a button slider engaged between the ramp face of the first torque ramp member and the ramp face of the second torque ramp member.

4. The system of claim 1, further comprising:

a permanent magnet attached to the first torque ramp member of each one of said clutches.

5. The clutch of claim 4 wherein magnetic poles of the permanent magnet are orientated with respect to as-energized magnetic poles of the electromagnet for one of repelling the first torque ramp member from the second torque ramp member along a reference axis and attracting the first torque ramp member toward the second torque ramp member along the reference axis.

6. The clutch of claim 1 wherein at least a portion of the first torque ramp member of each one of said clutches is made from a magnetically sensitive material.

7. The clutch of claim 1 wherein the second torque ramp member is an integral component of the electromagnet.

* * * * *